April 24, 1934. L. BENOIT Re. 19,143

EGG CARTON

Original Filed Oct. 24, 1927 3 Sheets-Sheet 1

Inventor:
Leon Benoit
by Manning & Manning
Attys

April 24, 1934. L. BENOIT Re. 19,143

EGG CARTON

Original Filed Oct. 24, 1927 3 Sheets-Sheet 2

Inventor:
Igon Benoit
by Wenning & Wenning
Attys

April 24, 1934. L. BENOIT Re. 19,143

EGG CARTON

Original Filed Oct. 24, 1927 3 Sheets-Sheet 3

Inventor
Igon Benoit
by Manning & Manning
Attys

Reissued Apr. 24, 1934

Re. 19,143

UNITED STATES PATENT OFFICE 19,143

EGG CARTON

Leon Benoit, Chicago, Ill.

Original No. 1,768,023, dated June 24, 1930, Serial No. 228,304, October 24, 1927. Application for reissue June 22, 1932, Serial No. 618,816

17 Claims. (Cl. 229—29)

This invention which relates to certain improvements in a knock-down carton for eggs and like commodities is particularly concerned with features which facilitate the assembly of the carton components, enhance the strength and utility thereof, and assure a more serviceable construction. These several phases of my invention will be explained at length in the specification and claims to follow, and are set forth in detail in the accompanying drawings which illustrate certain embodiments of the invention in the manner following:

Figure 2:
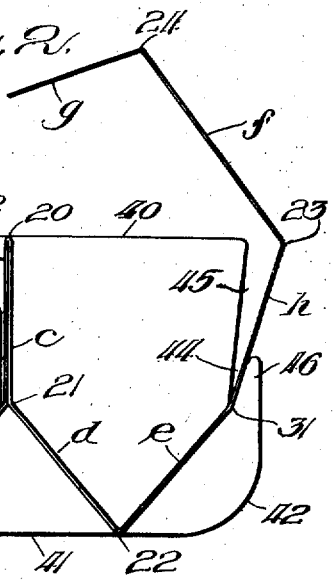
Fig. 2 is an end elevation thereof.
Figure 6:
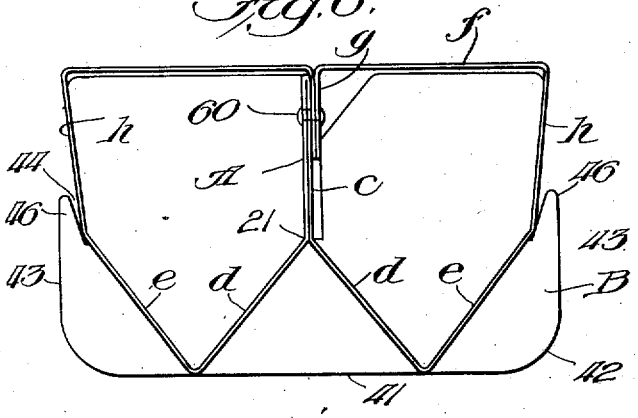
Figure 9:
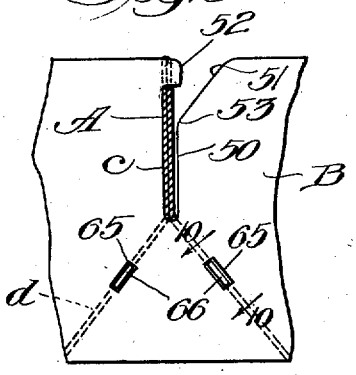
Figure 7:
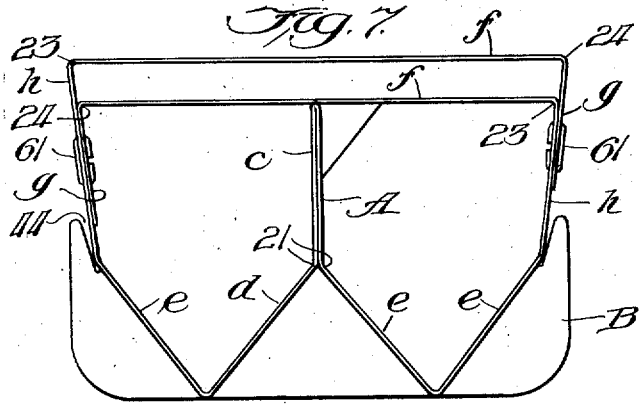
Figure 10:
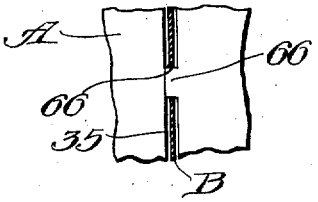
Figure 8:
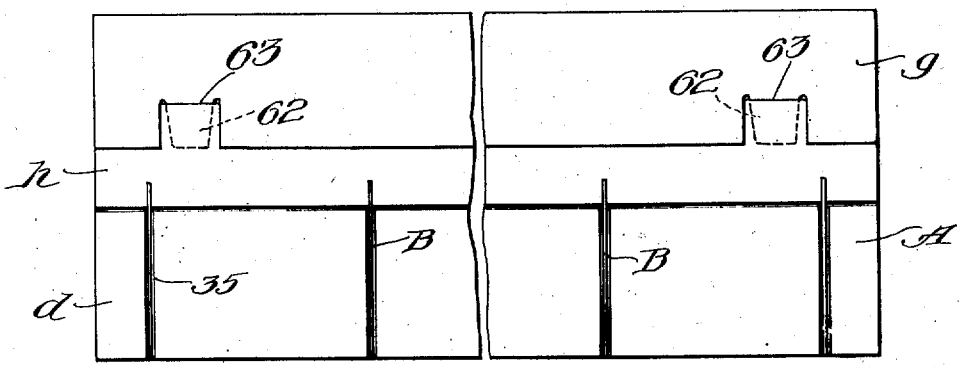
Figure 11:
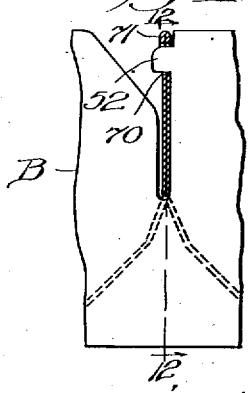
Figure 12:
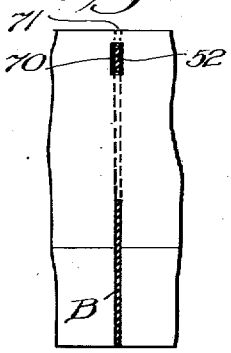
Figure 13:
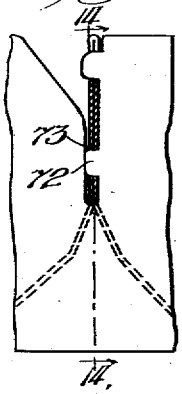
Figure 14:
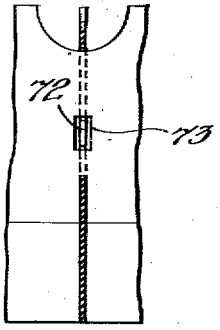
Figure 15:
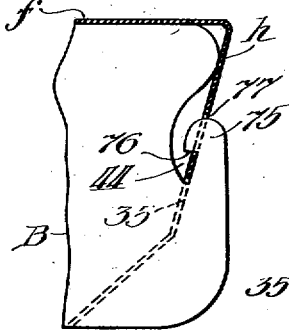
Figure 16:
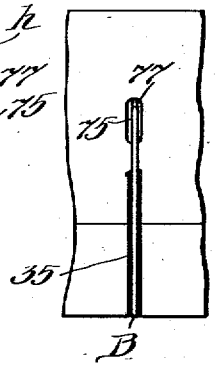
Figure 17:
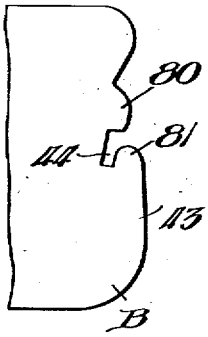
Figure 18:
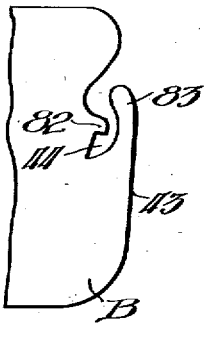
Figure 19:
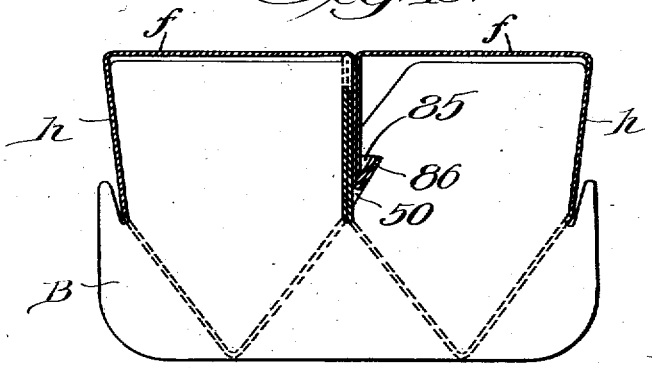

Fig. 6 which is a view similar to Fig. 2 shows the carton covers closed and secured in place;

Fig. 7 is a similar view of a carton whose covers are of modified construction;

Fig. 8 is a side elevation of a carton having the general cover construction of Fig. 7, but equipped with a modified fastening means;

Fig. 9 is a fragmentary view in elevation of a cross wall showing the interlocked blank in cross section, this construction being of a modified type;

Fig. 10 is a detail in section taken on line 10—10 of Fig. 9;

Fig. 11 which is view similar to Fig. 9 shows a further modification in the interlock of the blank with the cross wall;

Fig. 12 is a detail sectional view taken on line 12—12 of Fig. 11;

Fig. 13 which is a view similar to Fig. 11 shows a still further modification in the construction of interlock for the blank and cross wall;

Fig. 14 is a detail sectional view taken on line 14—14 of Fig. 13;

Fig. 15 is a fragmentary detail showing one notched edge of a cross wall which provides an interlock for the blank which is shown in cross section;

Fig. 16 is a side elevation of the parts shown in Fig. 15;

Figs. 17 and 18 are fragmentary views showing two further modifications in the notched interlock construction adjacent one edge of the cross wall; and Fig. 19 is a transverse section through the carton showing a further modified construction in which the covers are interlocked with a cross wall so as to be held thereby in closed position.

The carton herein shown and described is of that type which utilizes a blank A which is formed into bottom, side walls, and covers, and in conjunction therewith a plurality of cross walls B which provide ends and intermediate partitions. The blank is folded upon itself at 20 in its middle region and is also bendable at other points as indicated at 21, 22, 23, and 24. The general form of the blank so folded is that of the letter W. The folds 22 occupy lowermost positions, the folds 23 are adjacent the upper edge of the carton, and the folds 24 are adapted to occupy substantially a center position when the blank is closed over to provide covers for the carton. The bends 21 are disposed between the center and bottom folds 20 and 22, as shown. The sections of the blank between the fold 20 and bends 21 provide a vertically extending double wall *c*. Between the bends 21 and 22 are oblique sections *d*, between the folds 22 and 23 are other sections *e*, and between the folds 23 and 24 cover sections *f*. Joined to each cover section at the fold 24 is a flap *g*. In addition the blank is adapted to be further bent, when the carton is closed up, along the line 31 which defines between itself and the fold 23 one additional section *h* which is substantially vertically disposed. In the manufacture of a blank having the characteristics noted, the material, preferably a commercial fibrous product, may be scored or otherwise weakened along the lines where the several folds are to be made, so as to facilitate the operation of bending the blank to the form described.

Figure 1:
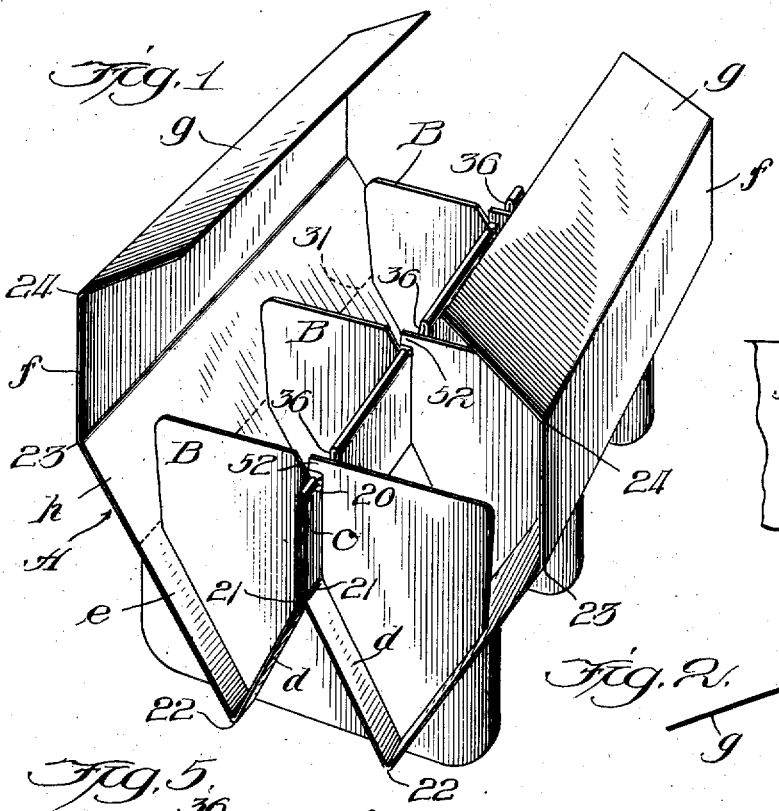
Figure 1 is a view in perspective of my improved carton in a size and form which presents four cells or compartments.

The blank is further provided upon opposite sides of its center fold with two sets of aligned slots 35 which extend between the bends 31 and 21. In line with these slots are openings 36 arranged in a row along the center line of the blank. When the blank is folded upon itself along its center line, as shown in Fig. 1, these several openings take on the form of semi-circular notches.

The cross wall components are preferably of the form which is shown best in Fig. 2. Each of these walls is of generally rectangular contour having an upper edge 40 and a bottom edge 41, with adjacent rounded corners 42. The side edges or ends of these walls may extend vertically as at 43 from the bottom, and are notched at 44 so that the remaining upper portion 45 of the side edges are inset and slanted outwardly to a slight extent, if desired. Each of the notches 44 is defined in part by a lug 46 which proceeds upwardly from the upper end of the edge 43.

Figure 4:
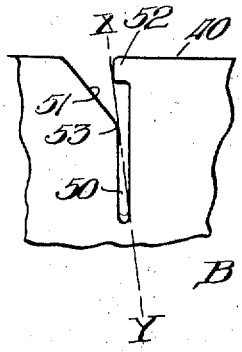
Fig. 4 is a fragmentary detail showing the central slot in one of the cross walls.

The cross walls are further characterized in each instance by a vertical slot 50 in the center region which extends downwardly from the upper edge 40. This slot is of peculiar formation, in that its opposite edges extend closely in parallel relation in the lower portion, but in its upper portion one edge 51 is obliquely inclined to provide an enlarged of flaring entrance for the slot. The opposite slot side is provided with a lug 52 extending partly across the entrance of the slot. The juncture point 53, where the oblique edge 51 meets with the vertical edge of the slot, is substantially tangential to a line $x$—$y$ drawn between the lug 52 and the lower slot end (see Fig. 4).

Figure 5:
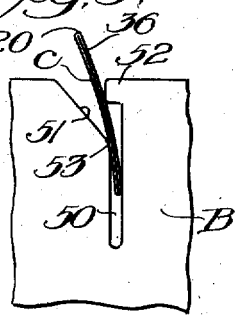
Fig. 5 is a similar view in which is shown in cross section the position of the blank as it is being interlocked with the cross wall.

The operation of assembling the cross walls B in the carton blank A may proceed as follows: The carton is first doubled upon itself along the fold line 20 so as to bring the two sets of slots 35 into register. The cross walls are then inserted into position within these slots the length of which exceeds the vertical dimension of the cross walls, and the latter are then shifted lengthwise of the blank slots so as to bring the double walled section $c$ down against the lower end of the cross wall slot 50. During this movement the double walled section $c$ of the blank is required to bend, as shown in Fig. 5, due to the obstructing position of the lugs 52. In the final position, the parallel edges of the slots 50 afford support to opposite sides of the double walled section $c$ such that it is held against tilting, and the lugs 52 project into the recesses 36 to prevent a reverse movement of the blank relative to the cross walls with a consequent separation of one from the other.

Figure 3:
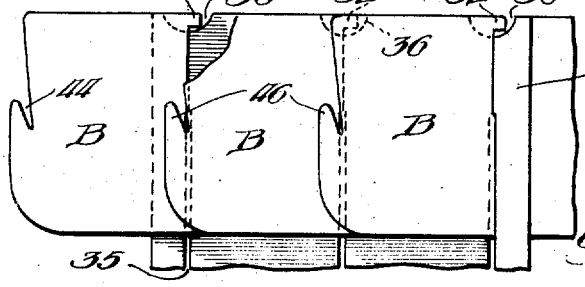
Fig. 3 is a fragmentary plan view of the carton in knock-down form.

With the walls assembled into the blank in this manner, the parts are interlocked securely against displacement. For convenience in packing and shipping, the walls may be turned flat against the blank, as suggested in Fig. 3. In this knock-down condition the carton occupies but very little space. It may be set up for use by bending the blank along the folds 22 which has the effect of bringing up the sections $e$ and $h$ until the latter are hooked into the notches 44. In this position, the lugs 46 act to retain the blank in a set-up condition with its upper sections $f$ and $g$ opened out to permit insertion of eggs or other commodities into the cells defined by the blank sections $d$ and $e$ and the intervening cross walls. As these cells are filled, the obliquely disposed sections $d$ and $e$ will be bowed out in conformity with the contour of the eggs or other commodities so set in place, with the result that the bottom folds 22 will be slightly lifted above the lower cross wall edges 41. The upper portions of the blank consisting of the sections $f$ and $g$ may thereafter be folded over the top of the carton, the sections $f$ meeting substantially along the center fold 20 so as to permit insertion of the two flaps $g$ vertically into the slots 50 along one side of the double walls $c$. This insertion takes place upon the sides of the slots 50 which are provided with the obliquely disposed edge 51, as appears clearly in Fig. 6.

The carton herein shown and described by way of exemplification is of the double row form; that is, its folds are so disposed in relation to the type of cross walls used as to present two rows of cells. Manifestly the length of these rows will be determined by the dimensions of the blank, and the number of compartments or cells will depend upon the number of cross walls which are used. In the construction shown, where the blank is bent to substantially W formation, two such rows are provided, but this may be increased by duplicating the folds wherever necessary to add rows to whatever number is desired. In such instances, the essential features of the invention will remain unchanged both as regards the formation of the blank and of the cross walls which co-operate therewith.

It is possible to vary the construction in numerous particulars from that which has already been described. For example, in Fig. 6, which shows the covers closed down upon the cartons, a fastening device 60 may be extended through the flaps $g$ and double walls $c$ at opposite ends of the carton. When this is done, the covers will be secured to each other, and also to the carton as well, thus ensuring against loss of articles contained within the carton.

It will be noted that when the carton is placed upon a table or other plane surface, it will rest upon the lower edges 41 of the cross walls. As the blank sections $d$ and $e$ are required to bow outwardly in conformity with the contour of articles placed within the cells, the lowermost folds 22 will be lifted slightly. For this reason, the eggs or other commodities are held in a suspended position slightly off of the surface on which the carton is placed. Adequate protection to the eggs or other contents is thus afforded from the bottom side of the carton. Should it be desired to give to the upper sides of the eggs or other contents protection further than that which is imparted by the covers $f$ resort may be had to the construction shown in Fig. 7. I have shown here one of the covers so dimensioned as to extend clear across the carton top, its associated flap $g$ being extended down into the notches 44 of the cross walls. The section $h$ on the opposite blank edge is of such size that the fold 23 will be positioned appreciably beyond the proximate fold 24 of the other cover. The section $f$ which is joined to this longer section $h$ extends over the other cover section from which it is separated by an appreciable distance, and the flap $g$ is adapted to be folded down upon the outer side of the section $h$ connecting with the under cover $f$.

Any suitable fastening means such as staples 61 may be extended through each flap $g$ and the proximate section $h$ so as to lock the double covers in the position shown. By reason of this construction I provide an enhanced protection for the carton contents, the outer cover being adapted to withstand any shocks received in handling and the lower cover to hold the eggs or other contents spaced away from such points of shock. If desired, the covers shown in Fig. 7 may, as suggested in Fig. 8, be secured by a tongue and slot connection which includes tongues 62 provided in the one cover component adapted for insertion through slots 63 in the other component, so as to provide a detachable form of fastening.

In Figs. 9 and 10, I have suggested a slightly altered form of interlock between the blank and the cross wall. This is accomplished by providing additional slots 65 in the cross walls in line with the sections $d$ of the blank. Extending into the slots 35 of the blank are lugs 66 adapted for insertion through the slots 65 of the cross walls when the latter are assembled in position within the blank. By this means the cross walls are held in place by means supplementary to the lugs 52 which project over the double walls of the blank.

Figs. 11 and 12 suggest a construction wherein the notches 36 along the center fold of the blank may be modified. Instead of having these in the form of circular openings which, when the blank is folded upon itself, present semi-circular recesses, I provide two separate openings 70 adapted to register when the blank is folded upon itself. Between these openings is an intervening portion 71 of the blank material which overlies the lugs 52 when the cross walls are inserted in place.

In the construction set forth in Figs. 13 and 14, the cross walls and blank may be interlocked the same as the ones first described. In addition, however, I may provide each cross wall with a lug 72 extending into its slot 50 adapted to lie within a slot 73 formed in the doubled wall section *c* of the blank when the carton components are assembled. By this construction two sets of interlocks are utilized, each independent of the other, although mutually supplementary.

It is possible also to modify in various ways the construction of the notches which are provided in the ends or side edges of the cross walls as suggested, for example, in Figs. 15 to 18 inclusive. In the first of these figures, the notch 44 is formed adjacent a lug 75 having a head with an overhanging shoulder 76 adapted for insertion into a slot 77 which is formed in the blank section *h* adjacent one end of the slot 35, but removed therefrom. Preferably the slot 77 is wider than the slot 35 to facilitate insertion of the shoulder 76. When the blank and cross walls are assembled, the section *h* is bent into position, so that the blank portion 78 which lies between the two slots 77 and 35 may occupy a position below the shoulder 76 of the lug head. The connection thus provided is in effect an interlock with the lug acting as a hook to prevent disassembly.

The notch 44 of Fig. 17 is disposed below an overhanging lug 80 projecting from the side edge of the cross wall. Such a lug is adapted to lie within the slot 77 in the blank, when made according to the showing of Fig. 15, the blank portion 78 being disposed within the notch and being confined therein by a lug 81.

A combination of the ideas set forth in Figs. 15 and 17 is suggested in Fig. 18 wherein the cross wall is provided with a lug 82 projecting into the notch 44 for insertion through the slot 77 in the blank. In addition, a lug 83 extends upwardly past the lug 82 and slightly inwardly so as to require a flexing of the blank section *h* before the latter can be interlocked with the cross wall.

The manner in which the carton covers are secured in place may follow the showing of Fig. 6, or, with slight modification, be constructed as per Fig. 19. In this latter example, the slot 50 in its lower portion is provided with an undercut notch 85 wherein may be received the turned edges 86 of the two cover flaps *g*. These turned edges tend to spring outwardly and after being forced into position within the notch will resist opening movement of the covers. T is is a simple form of self-locking cover construction which may be found advantageous for certain purposes.

The features of my invention, as set out in the preceding description, tend to a more certain and secure assembly of the carton components. Without the provision of locking means by which to prevent accidental displacement of the cross walls from the blank, the use of the present carton will be attended with certain disadvantages. This tendency of the blank to separate from the cross walls is particularly noticeable before the covers are closed down. During the operation of filling the carton, the upper portions of the blank will be extended outwardly somewhat, as illustrated in Fig. 1, in which position it is important that the blank should remain engaged with the side edges of the cross wall. By the notch constructions which I have shown and described any separation of the blank from the cross walls at these points is effectively prevented.

I claim:

1. An egg holder in which is comprised a blank having plural sets of aligned slots, the blank being folded upon itself along a line between two sets of slots, and a plurality of cross walls each having a slot proceeding inwardly from one edge adapted for insertion through the slots of the blank, each cross wall being provided with means partially obstructing the entrance to its own slot adapted to overlie an edge of the blank whereby to retain the cross walls in interlocked relation therewith.

2. An egg holder in which is comprised a blank having two sets of aligned slots, the blank being folded upon itself between the two sets of slots and having notches in its folded edge in line with the slots, and a plurality of cross walls each provided with a slot extending inwardly from one edge adapted for insertion within the slots of the blank, each cross wall having means partially obstructing the entrance to its own slot adapted to lie within the notch adjacent the folded edge of the blank when the cross walls are moved to final position relative to the blank.

3. A holder in which is comprised a blank folded upon itself to provide double walls and provided further with two sets of slots on opposite sides of the fold, and a cross wall adapted for insertion within the slots of the blank, each cross wall being provided with a slot extending inwardly from an edge which is disposed adjacent the folded edge of the blank, the entrance to the slot in the cross wall being flared in one direction and having an obstruction extending partly thereacross from the opposite side whereby the double walls of the blank when received within the slot of the cross wall may lie beneath said obstruction.

4. A holder in which is comprised a blank folded upon itself to present double walls and provided with two sets of slots, there being a cut through the two walls of the blank adjacent the fold and in line with each pair of slots, and a plurality of cross walls adapted for insertion within the slots of the blank, each cross wall having a slot extending inwardly from one edge thereof and provided with means partially obstructing the entrance to said slot, each cross wall, when moved to a final position in the blank, being adapted to present its obstructions through the cut in the double walls of the blank whereby to interlock the cross walls therewith.

5. In an egg holder, the combination of a blank which is folded upon itself and provided on opposite sides of the fold with plural sets of aligned slots and a plurality of slotted cross walls adapted for insertion within the slots of the blank for interlocking therewith, there being formed in opposite edges of the cross walls notches each having means projecting thereinto, and the blank being foldable for engagement within said notches, the projecting means co-acting with the blank to lock the same in said notches.

6. In a holder, the combination of a folded blank having aligned sets of slots, and a plurality of slotted cross walls adapted for insertion within said slots for interlocking with the blank, there being notches formed in opposite edges of the cross walls together with projecting means partially obstructing the entrance to said notches, the blank being further provided with openings into which the said projecting means may enter, the blank being adapted for cooperation with said notches whereby to be interlocked therewithin.

7. A holder in which is comprised a foldable blank having slots therein, a slotted cross wall insertable within the slots of the blank for interlocking therewith, one side of the blank being foldable around one end of the cross wall and across the top edge thereof adjacent thereto, and the other side of the blank being foldable around the opposite end of the cross wall across the top thereof remote therefrom and down upon the cross wall end first named, the two portions of the blank so extended across the top of the cross wall being spaced from each other, and means for securing the two edges of the blank in fixed relation when so folded.

8. A holder in which is comprised a plurality of slotted cross walls, and a blank interlocking with said cross walls, the blank having one side foldable over the cross walls adjacent thereto, and having its other side also foldable over the cross walls but in spaced relation thereto, and means for securing in fixed relation the two blank sides so extended over the cross walls.

9. In a holder, a blank folded upon itself to provide double walls having registering slots, there being a notch in the fold in line with the slots, and a cross wall insertable through the slots of the blank, the cross wall being provided with a slot extending inwardly from one edge thereof for receiving the double walls of the blank, the edges of the cross wall slot being closely parallel throughout their inner portion whereby to support the blank laterally on opposite sides, and in the outer slot portion one of said edges being inclined away from the other whereon is formed a lug projecting into the widened slot entrance affording a partial obstruction at such point, the blank being movable into the slot past such obstruction only by a bending of its double walls which in final position are supported by the parallel edges of the slot, the lug being then disposed within the notch adjacent the blank fold whereby to interlock the blank and cross wall.

10. A holder comprising a slotted folded blank and a plurality of cross walls insertable through the slots in said blank; said cross walls having means engaging the end of a slot in said blank whereby to support said blank thereon, one of said members being additionally slotted and the other of said members having means extending transversely through said second slots and cooperating with said first mentioned means for effecting an interlocking of the cross walls and blank for preventing disassembly of the same.

11. A holder comprising a blank folded in the general form of the letter W with oppositely inclined slotted walls, a plurality of cross walls insertable through the slots in said inclined walls and having means engaging the end of a slot in said blank whereby to support said blank thereon, one of said members being additionally slotted and the other of said members having means extending transversely through said second slots and cooperating with said first mentioned means for effecting an interlocking of the cross walls and blank for preventing disassembly of the same.

12. A holder in which is comprised a blank bent in the general form of a letter W with oppositely inclined slotted bottom sections meeting at an elevated point centrally of the carton, a plurality of cross walls having their lower portions inserted through the slotted bottom sections of the blank and provided with edge notches for engaging therewith to support the bottom sections, one of said members being additionally slotted and the other of said members having means extending transversely through said second slots and cooperating with said first mentioned means for effecting an interlocking of the cross walls and blank for preventing disassembly of the same.

13. An egg holder comprising a longitudinally creased and bent blank provided with a longitudinal series of transverse slots aligned transversely in groups of at least three slots, and a plurality of cross walls, each cross wall cooperating with a group of slots by means of two upwardly facing notches formed on the edge thereof for supporting the blank thereon by engagement with two of said slots, said cross walls being formed to provide edge means extending transversely through the third slot of each group and cooperating with said other engaged slots and notches to secure said wrapper and each respective cross wall against relative movement.

14. In a collapsible egg holder, foldable trough members arranged side by side and having oppositely inclined slotted bottom sections meeting in a ridge centrally of the holder, a plurality of cross walls each having a plurality of slots adapted for insertion through the slots of the trough members, and each cross wall being further provided with laterally extending means partially obstructing the entrance to each of said slots adapted to interlock respectively with the ridge and outer side walls of said trough members.

15. A collapsible egg holder in which is comprised a blank which is folded longitudinally upon itself along a line to form a longitudinal partition the walls of the folded portion being oppositely inclined to provide with the blank spaced trough portions, and a plurality of slotted cross walls adapted to embrace the blank adjacent the fold within the slots of the cross walls, each cross wall being formed with means pivotally connecting itself to the blank at spaced points longitudinally of the holder and holding said cross walls against downward movement.

16. A collapsible egg holder comprising a slotted blank, the blank being folded longitudinally upon itself along a line to form a central partition the walls of the folded portion being oppositely inclined to provide with the blank sides and bottoms of laterally spaced trough portions, and a plurality of slotted cross walls adapted to embrace the blank adjacent the fold within the slots of the cross walls, each cross wall being further provided with means pivotally connecting itself to the blank at spaced points longitudinally of the holder and remote from the slots therein and holding said cross walls against downward movement.

17. A collapsible egg holder in which is comprised a blank having two sets of aligned slots, the blank being folded longitudinally upon itself along a line between the sets of slots to form a longitudinal partition the slotted walls of the folded portion being oppositely inclined to provide with the blank sides and bottoms of trough portions which are spaced centrally of the holder, and a plurality of slotted cross walls adapted to embrace the blank adjacent the fold within the slots of the cross walls, and having means for interlocking engagement with the inclined slotted portions of the blank, each cross wall being further provided with means pivotally connecting itself to the blank at spaced points longitudinally of the holder and remote from the slots therein and holding said cross walls against downward movement.

LEON BENOIT.